(12) United States Patent
Okuno

(10) Patent No.: US 6,669,356 B2
(45) Date of Patent: Dec. 30, 2003

(54) SHEET FOR AN ILLUMINATION DEVICE, ILLUMINATION DEVICE, AND LIQUID CRYSTAL DISPLAY

(75) Inventor: Hiroshi Okuno, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1 day.

(21) Appl. No.: 09/745,741

(22) Filed: Dec. 26, 2000

(65) Prior Publication Data

US 2001/0006461 A1 Jul. 5, 2001

(30) Foreign Application Priority Data

Dec. 27, 1999 (JP) .......................................... H11-369300
Nov. 24, 2000 (JP) .......................................... 2000-356913

(51) Int. Cl.$^7$ ................................ F21V 3/00; F21V 5/00
(52) U.S. Cl. ........................... 362/311; 362/31; 362/27; 362/331; 362/360
(58) Field of Search ............................. 362/31, 26, 27, 362/97, 331, 360, 311

(56) References Cited

U.S. PATENT DOCUMENTS

| | | | | |
|---|---|---|---|---|
| 4,918,577 A | * | 4/1990 | Furudate | 362/31 |
| 5,727,862 A | * | 3/1998 | Wu | 362/27 |
| 5,949,505 A | * | 9/1999 | Funamoto et al. | 349/65 |
| 6,068,381 A | * | 5/2000 | Ayres | 362/31 |

FOREIGN PATENT DOCUMENTS

| | | |
|---|---|---|
| JP | 6-27328 | 2/1994 |
| JP | 6-37827 | 5/1994 |
| JP | 11-306835 | 11/1999 |

OTHER PUBLICATIONS

Chinese Office Action dated Jan. 31, 2003 along with English Translation thereof.

* cited by examiner

*Primary Examiner*—Stephen Husar
*Assistant Examiner*—Sharon Payne
(74) *Attorney, Agent, or Firm*—Nixon & Vanderhye P.C.

(57) ABSTRACT

An illumination device has a diffusive sheet that diffuses light. The sheet is fitted to a main body 3 of the illumination device by being sandwiched, in the direction of the thickness of the sheet, between the main body 3 and a frame 4 fitted thereto. The sheet has a cut formed in a portion thereof sandwiched between the frame 4 and the main body 3 to prevent bends that develop with a variation in temperature.

21 Claims, 14 Drawing Sheets

SHEET FOR AN ILLUMINATION DEVICE, ILLUMINATION DEVICE, AND LIQUID CRYSTAL DISPLAY

BACKGROUND OF THE INVENTION

1. Field of the Invention

The present invention relates to an illumination device for use in a transmissive liquid crystal display or the like.

2. Description of the Prior Art

FIG. 11 is a longitudinal sectional view showing the structure of a liquid crystal display equipped with a conventional illumination device of an edge-light type. This liquid crystal display is provided with an illumination device 1 and a liquid crystal display panel 2 illuminated by the illumination device 1. The illumination device 1 is provided with a main body 3 including tubular light sources 8, a frame 4 fitted to the main body 3, and a plurality of sheets 5, 6, and 7 arranged between the main body 3 and the frame 4.

The main body 3 is provided with a box-shaped lamp case 9 open at the top, a reflecting plate 10 arranged inside the lamp case 9 and shaped like a flat tube, and a light guide plate 11 arranged inside the reflecting plate 10 and having a diffusive pattern formed or printed on its bottom surface. The light sources 8 extend in the direction perpendicular to the plane of the figure, and are supported and fixed, through unillustrated supporting members, in spaces formed between each side surface of the light guide plate 11 and the side wall of the reflecting plate 10 facing it so as to be placed in the vicinity of the two side surfaces (light entrance surfaces) of the light guide plate 11.

The reflecting plate 10 is so formed as to extend parallel to and close to the inner surfaces of the bottom and side walls of the lamp case 9 and on the bottom surface of the frame 4, and has a part of its top wall cut out along the axial direction to form an opening. The top wall of the reflecting plate 10 covers the light sources 8 from above, and reaches both side edges of the top surface of the light guide plate 11.

The sheets 5 to 7 have diffusive, condensing, or other optical properties, and are all so formed as to transmit light. The sheets 5 and 7 are diffusive sheets, and the sheet 6 is a condensing sheet. The sheets 5 to 7 are so arranged as to face each other, and are supported and fixed on the main body 3 by being sandwiched, at their edges, between the frame 4 and the reflecting plate 10 so as to face an opening 4a of the frame 4.

The liquid crystal display panel 2 is arranged above the frame 4 so as to face the opening 4a of the frame 4. The placement of the sheets 5 to 7 between the frame 4 and the reflecting plate 10 permits the liquid crystal display panel 2 to be illuminated with uniform light all over its surface.

FIG. 12 is a longitudinal sectional view showing the structure of a liquid crystal display equipped with a conventional direct backlight, which illuminates a display panel directly from beneath. Here, such components as have their counterparts in the liquid crystal display shown in FIG. 11 are identified with the same reference numerals, and overlapping descriptions will not be repeated. In this liquid crystal display, the main body 3 is provided with a reflecting plate 12 shaped like a bottomed flat tube, and a diffusive plate 13 that is arranged on the top surface of a flange 12a formed around the opening of the reflecting plate 12 and that has a diffusive pattern printed on its top surface.

The light sources 8 extend in the direction perpendicular to the plane of the figure, and are supported and fixed, through unillustrated supporting members, inside the reflecting plate 12. The sheets 5 to 7 are supported and fixed on the main body 3 by being sandwiched, at their edges, between the frame 4 and the diffusive plate 13 so as to face the opening 4a of the frame 4.

In the conventional illumination devices described above, when the sheets 5 to 7 are placed between the frame 4 and the reflecting plate 10 (or the diffusive plate 13), the sheets leave a clearance C of 0 to 0.1 mm in the direction of their thickness. The clearance C here is the value given by L−T, where L represents the length, as measured in the direction of the thickness of the sheets 5 to 7, of the space (hereinafter called the sheet placement space) in which the sheets 5 to 7 are sandwiched between the frame 4 and the reflecting plate 10 (or the diffusive plate 13), and T represents the sum of the thickness of the sheets 5 to 7.

When the sheets having optical properties as described above (hereinafter called the optical sheets) exhibit a high degree of thermal expansion/contraction and their bases are made of materials prone to deformation due to thermal stress, under conditions where the ambient temperature around the liquid crystal display exceeds 85° C. as when, for example, the liquid crystal display is employed in car-mounted equipment mounted on a car under the flaming sun in summer, the optical sheets 5 to 7 curl within the space between the frame 4 and the reflecting plate 10 (or the diffusive plate 13), as shown in FIGS. 13 and 14, under the influence of heat. This causes the sheets 5 to 7 to interfere with each other and develop wavelike bends, and thus leads to degradation in the display quality of the liquid crystal display. Specifically, by bringing the liquid crystal display into a display state and observing it obliquely from above, from below, from the left, or from the right, one can visually recognize the bends in the optical sheets 5 to 7.

In tropical or desert regions of the world, it is not rare that the ambient temperature around the liquid crystal display exceeds 95° C. Even in such a harsh temperature environment, the liquid crystal display needs to maintain satisfactory display quality.

Incidentally, as shown in FIG. 15, an optical sheet is given its function by forming on the surface of a base 21 made of polyethylene terephthalate (hereinafter abbreviated to PET) a coating layer 22 that is a thin film of a material having a condensing, diffusive, or other optical property.

In a liquid crystal display, in addition to an optical sheet, a shielding sheet is also used as a measure against unwanted emission such as electromagnetic radiation and noise. A shielding sheet is given its function by forming on the surface of a base 21 made of PET a coating layer 23 that is a thin film of a transparent conductive material. A shielding sheet is a transparent sheet.

These sheets are formed by being punched out from a large master sheet into the desired shapes. The sheets are thin plates of resin, and are thus relatively soft. Therefore, unlike metal sheets, of which the edges are liable to injure the hands of their handlers during assembly and transportation, there is no need to treat the edges of the sheets so as not to injure their handlers' hands; that is, the sheets are used as they are punched out.

In these sheets, the base 21 has a different thermal expansion speed from the coating layer 22 or 23, and therefore, as temperature rises, the sheets curl. The greater the rise $\Delta T_1$ in temperature, the more conspicuous the phenomenon. Likewise, the base 21 has a different thermal contraction speed from the coating layer 22 or 23, and therefore, as temperature falls by $\Delta T_2$ from a high temperature to an ordinary temperature, the sheets develop conspicuous curl even during cooling.

For example, in a diffusive sheet having properties as described above, when thermal expansion/contraction produces a force that tends to curl the sheet, the sheet 14 develops, as shown in FIG. 16, wavelike bends where there is a scant margin in the direction of the thickness of the sheet 14 as between the frame 4 and the reflecting plate 10, i.e. where there is nowhere for stress to escape.

Such bends can be reduced by, as shown in FIGS. 17A and 17B, bonding the sheet 14, along all four sides thereof, to the inner surface of the frame 4. This helps prevent bends around the bonded portion 15 of the sheet 14, but instead causes large bends in the central portion of the sheet 14. Thus, by bringing the liquid crystal display into a display state and observing it obliquely from above, from below, from the left, or from the right, one can visually recognize the bends in the sheet 14.

Such bends can be reduced by, as shown in FIGS. 18A and 18B, bonding the sheet 14, along only one side thereof, to the inner surface of the frame 4. This causes concentration of stress on the opposite side to the bonded portion 15 of the sheet 14, and thus cause large bends on the opposite side to the bonded portion 15 of the sheet 14. Thus, by bringing the liquid crystal display into a display state and observing it obliquely from above, from below, from the left, or from the right, one can visually recognize the bends in the sheet 14.

Although diffusive sheets are dealt with in FIGS. 16, 17A, 17B, 18A, and 18B, the same phenomenon occurs also with optical sheets of other types and with shielding sheets. Moreover, this phenomenon occurs not only in the case of an illumination device of an edge-light type but also in the case of a direct backlight.

The applicant of the present invention once proposed, in Japanese Patent Application Laid-Open No. H11-306835, a technique that exemplifies a measure to overcome the problem described above. According to this technique, a chassis provided near an optical sheet so as to hold the edges of the optical sheet is so shaped as to hold the optical sheet at intervals (i.e. at discreet spots). Alternatively, another member, separate from a chassis and formed as a sheet-shaped or plate-shaped member, is provided between the chassis and an optical sheet so as to hold the optical sheet at intervals. In either way, wavelike bends that develop in the optical sheet are passed along toward four sides of the display surface of the liquid crystal display so that there remain no bends in the central portion of the display surface, and simultaneously the bends in the peripheral portion of the display surface are alleviated.

However, this technique does not provide a sufficiently effective measure against the problem under conditions where the ambient temperature around the liquid crystal display exceeds 85° C.

Quite imaginably, also in illumination devices of older designs for use in liquid crystal displays, optical sheets should develop bends under the influence of heat in environments with very high ambient temperatures. However, such older illumination devices are not made so compact and lightweight as those of today, and this permits the above-mentioned clearance to be made sufficiently large to keep the problem negligible. By contrast, today, compact and lightweight illumination devices are keenly sought after, and accordingly the clearance in question is supposed to be made smaller and smaller in the future. This makes techniques for reducing heat-induced bends in optical and other sheets increasingly important in the future.

On the other hand, Japanese Patent Application Laid-Open No. H7-56166 teaches cutting off four corners of a light guide plate to prevent its deformation by the heat generated by a tubular light source. However, this invention pays no attention to the effect of heat on an optical or shielding sheet.

SUMMARY OF THE INVENTION

An object of the present invention is, in cases where an illumination device used in a liquid crystal display or the like has a sheet that exhibits high thermal expansion/contraction and that has a base prone to deformation due to thermal stress, to prevent wavelike bends that develop in the sheet under the influence of heat from being visually recognized in the display surface of the liquid crystal display or the like.

To achieve the above object, according to one aspect of the present invention, a sheet for an illumination device is provided inside the illumination device and fitted to a main body of the illumination device by being sandwiched, at least at a portion of the sheet and in the direction of the thickness of the sheet, between the main body and a frame fitted to the main body, and has a cut formed at least at one spot in the portion of the sheet in order to prevent bends that develop with a change in temperature.

According to another aspect of the present invention, an illumination device is provided with: a main body of the illumination device including a light source; a frame fitted to the main body; and a sheet or a plurality of sheets fitted to the main body by being sandwiched, at least at a portion of the sheet or sheets and in the direction of the thickness of the sheet or sheets, between the frame and the main body. Here, a cut is formed at least at one spot in the portion of at least one sheet among the sheet or sheets in order to prevent bends that develop with a change in temperature.

According to another aspect of the present invention, in a liquid crystal display including an illumination device and a liquid crystal display panel illuminated by the illumination device, the illumination device is provided with: a main body of the illumination device including a light source; a frame fitted to the main body; and a sheet or a plurality of sheets fitted to the main body by being sandwiched, at least at a portion of the sheet or sheets and in the direction of the thickness of the sheet or sheets, between the frame and the main body. Here, a cut is formed at least at one spot in the portion of at least one sheet among the sheet or sheets in order to prevent bends that develop with a change in temperature.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
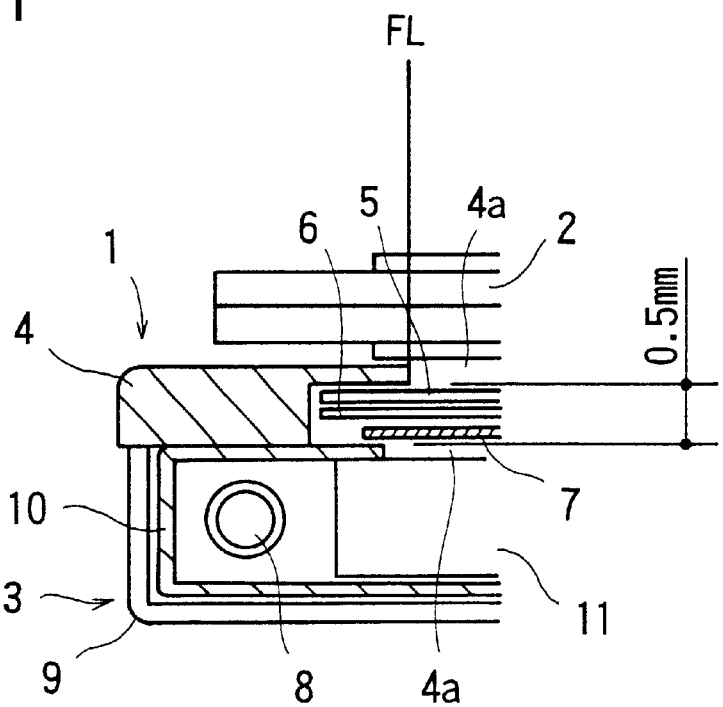
FIG. 1 is a longitudinal sectional view of a portion of a liquid crystal display provided with the illumination device of a first embodiment of the invention.
Figure 2:
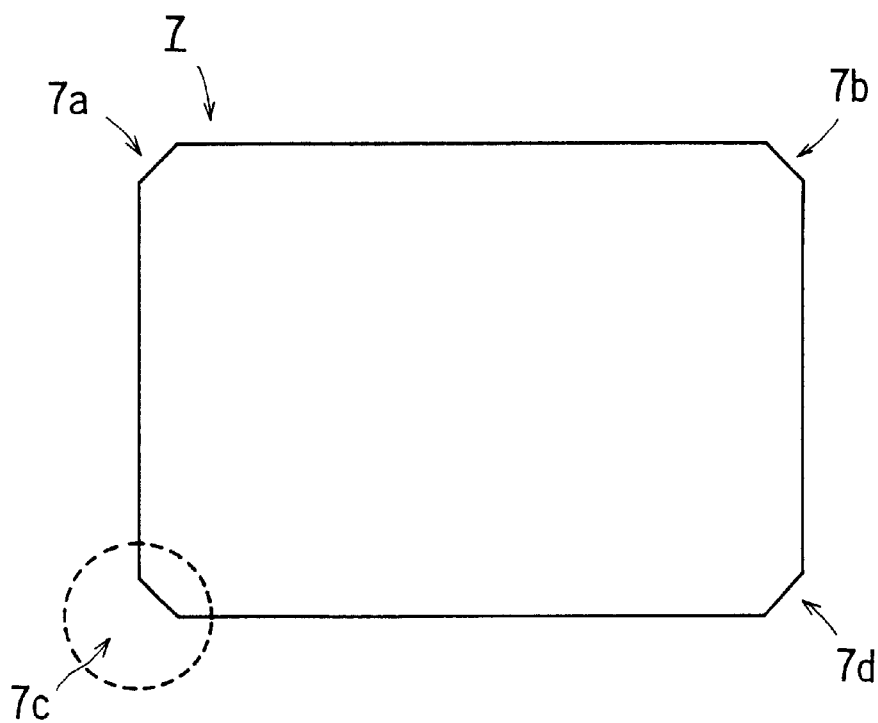
FIG. 2 is a plan view of the diffusive sheet employed in the illumination device shown in FIG. 1.
Figure 11:
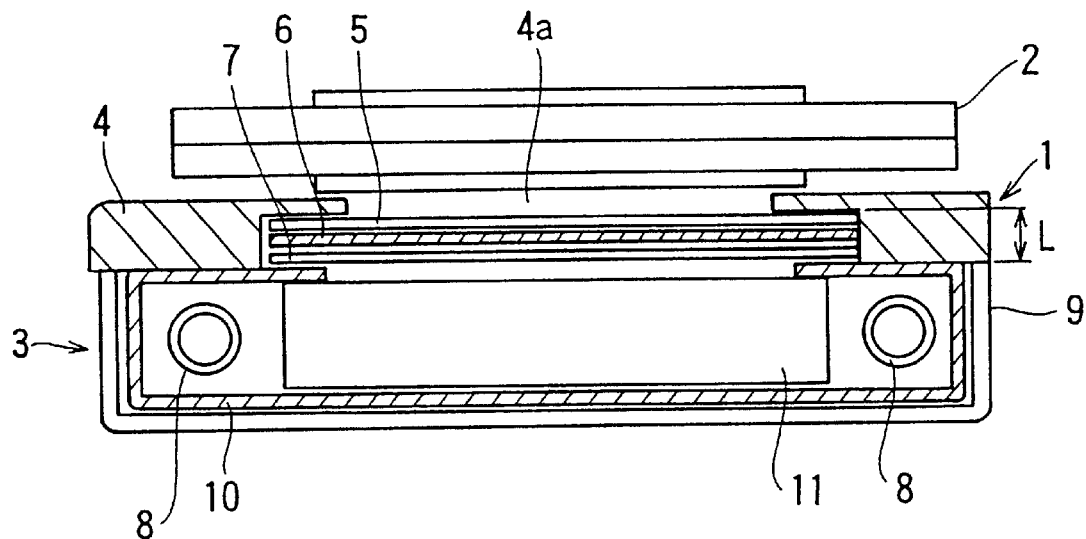
FIG. 11 is a longitudinal sectional view showing the structure of a liquid crystal display provided with a conventional illumination device of an edge-light type.

Hereinafter, embodiments of the present invention will be described with reference to the drawings. FIG. 1 is a longitudinal sectional view of a portion of a liquid crystal display provided with the illumination device of a first embodiment of the invention. FIG. 2 is a plan view of the diffusive sheet employed in the illumination device of FIG. 1, and FIG. 3 is an enlarged view of FIG. 2. In this embodiment, such components as have their counterparts in the conventional example shown in FIG. 11 are identified with the same reference numerals, and overlapping descriptions will not be repeated.

In this embodiment, the length L of the sheet placement space as measured in the direction of the thickness of the sheets 5 to 7 is set to be 0.5 mm. The sheets 5 to 7 are made of PET, which is highly heat-resistant, and have a thickness of 100 μm or greater each. The sheets 5 to 7 may be made of any other material and be of any other thickness. In this embodiment, to prevent heat-induced bends in the sheets 5 to 7, of these sheets 5 to 7, the diffusive sheet 7 placed closest to the light guide plate 11 has, in its four corners 7a, 7b, 7c, and 7d, cuts formed in a chamfered shape (i.e. in a shape as if chamfered). It is to be noted that "forming a cut in a chamfered shape" denotes, in the case of a sheet in the shape of a polygon having angular corners, cutting off a corner thereof along a straight line and, in the case of a sheet in other shapes having no corners, cutting off an end portion thereof, as viewed in the direction of the length of the sheet in which thermal expansion/contraction is greater, along a straight line.

Forming the sheet 7 in this way leaves a clearance C (the value obtained by subtracting the sum of the thickness of the sheets 5 to 7 from L) of 0 to 0.1 mm except where the sheet 7 is cut off and of 0.2 to 0.25 mm where the sheet 7 is cut off. Thus, where the sheet 7 is cut off, the clearance C makes up a larger proportion, namely two fifths or more, of the length L (0.5 mm) of the sheet placement space as measured in the direction of the thickness of the sheets 5 to 7.

By cutting off the corners of the sheet 7 in this way, an extra margin is produced in the direction of the thickness of the sheets 5 to 7 in the space between the frame 4 and the reflecting plate 10 where there has conventionally been only a scant margin in that direction. Thus, even if thermal expansion/contraction produces a force that tends to curl the adjoining sheets 5 and 6, there is room for stress to escape. Moreover, the sheet 7, with its corners cut off, develops curl only to a far smaller degree. As a result, no wavelike bends develop in the sheets 5 to 7, and thus, even when temperature varies inside or outside the liquid crystal display, the initial display quality of the liquid crystal display can be largely maintained.

Figure 3A:
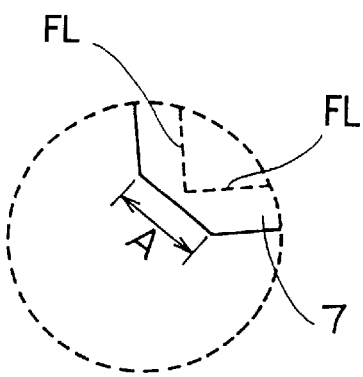
FIG. 3A is an enlarged view of a portion of FIG. 2.

In the sheet 7 shown in FIG. 2, its corners are cut off, as shown also in FIG. 3A, along a straight line at an angle of 45° to each side of the sheet 7. More specifically, in the case of a liquid crystal display panel measuring 78 mm in length and 133 mm in width, the corners are cut off in such a way that the length A of the line along which they are cut off is about 4 mm. The corners 7a to 7d of the sheet 7 may be cut off at any angle other than 45°, and in any shape as long as the cuts do not cross the frame opening line FL. It is to be noted that the frame opening line FL is a line that defines the rim of the opening 4a of the frame 4; that is, it is a line that passes the rim of the opening 4a and extends in the direction of the thickness of the sheets 5 to 7. This prevents the cuts formed in the sheet 7 from being visually recognized through the opening 4a of the frame 4, and thus prevents degradation in display quality.

Figure 3B:
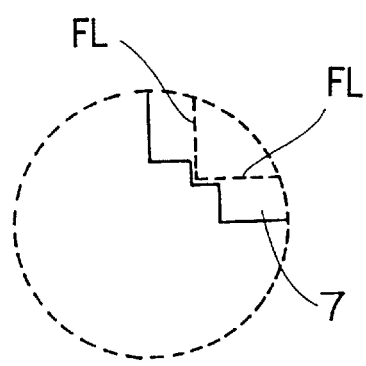
FIG. 3B is an enlarged view of a portion of FIG. 2, illustrating a modified example of the shape of the cut.
Figure 3C:
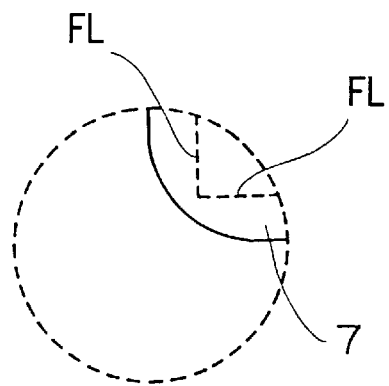
FIG. 3C is an enlarged view of a portion of FIG. 2, illustrating a modified example of the shape of the cut.

As shown in FIG. 3B, the corners of the sheet 7 may be cut off in a stepped shape so as not to cross the frame opening line FL. Alternatively, the corners of the sheet 7 may be cut off in a rounded shape so as not to cross the frame opening line FL. It is to be noted that "forming a cut in a rounded shape" denotes cutting off a portion of the sheet along an arc or a curve. For example, in the case of a liquid crystal display measuring 78 mm in length and 133 mm in width, the arc have a radius of about 7 mm. Cuts in a chamfered, rounded, or stepped form as described above can be formed simultaneously when the sheet is punched out, and can therefore be formed without an additional production step and thus with satisfactory productivity. The corners of the sheet 7 may be cut off in any other shape than specifically described above as long as the cuts do not cross the frame opening line FL.

Since the sheet 7 is thin, its corners tend to curl up, be deformed, or break off during assembly or transportation. This, too, can be prevented by cutting off the corners of the sheet 7.

Although FIG. 1 shows a case where the present invention is applied to a structure that includes a plurality of optical sheets like the diffusive sheet 5, the condensing sheet 6, and the diffusive sheet 7, the present invention can be applied also to structures that combine an optical sheet and a shielding sheet, structures that combine an optical sheet and a sheet of a type other than a shielding sheet, structures that combine more than one sheet of a type other than a shielding sheet, or any other structures. Moreover, although FIG. 1 shows a case where a plurality of sheets is used in combination, the present invention can be applied also to structures that include only one sheet. What are called sheets here include optical sheets, shielding sheets, and any other sheets formed in the shape of a thin plate to serve various purposes.

Figure 4:
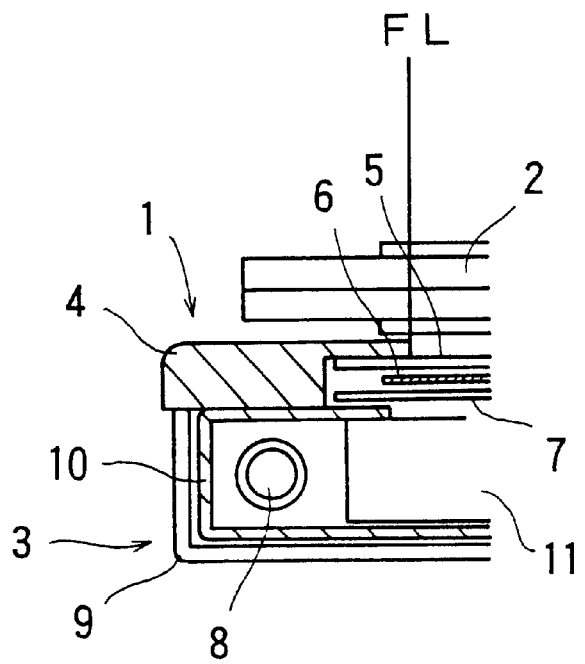
FIG. 4 is a longitudinal sectional view of a portion of a liquid crystal display provided with the illumination device of a second embodiment of the invention.
Figure 5:
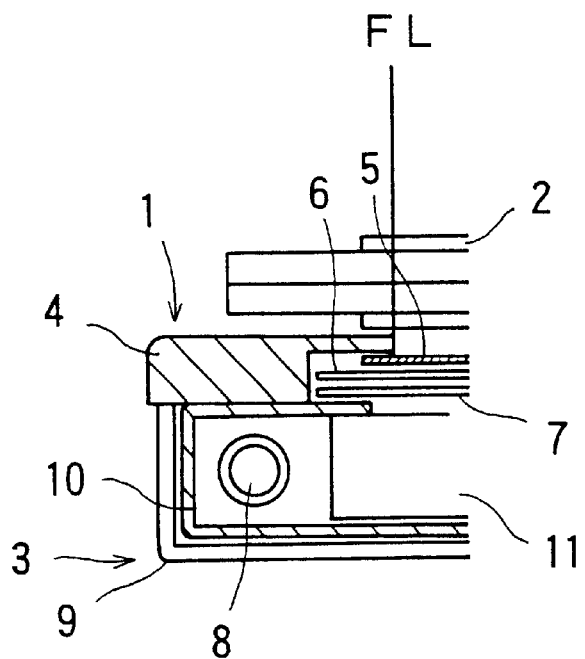
FIG. 5 is a longitudinal sectional view of a portion of a liquid crystal display provided with the illumination device of the second embodiment.

Next, a second embodiment of the invention will be described. FIGS. 4 and 5 are longitudinal sectional views of a portion of liquid crystal displays provided with the illumination device of the second embodiment. It is to be noted that, in the descriptions of this and the following embodiments of the invention, such components as have their counterparts in the first embodiment are identified with the same reference numerals, and that overlapping descriptions will not be repeated.

This embodiment differs from the first embodiment in that, whereas in the first embodiment the diffusive sheet 7 has its corners cut off, in the example shown in FIG. 4 the condensing sheet 6 has its corners cut off and, in the example shown in FIG. 5, the diffusive sheet 5 has its corners cut off.

In these structures, just as in the first embodiment, the clearance C is 0 to 0.1 mm except where the corners are cut off and 0.2 to 0.25 mm where the corners are cut off. Thus, where the sheet 5 or 6 is cut off, the clearance C makes up a larger proportion, namely two fifths or more, of the length L (0.5 mm) of the sheet placement space as measured in the direction of the thickness of the sheets 5 to 7.

By cutting off the corners of any one of the plurality of sheets 5 to 7 in this way, an extra margin is produced in the direction of the thickness of the sheets 5 to 7 in the space between the frame 4 and the reflecting plate 10 where there has conventionally been only a scant margin in that direction. Thus, even if thermal expansion/contraction produces a force that tends to curl the sheets adjoining the sheet that has its corners cut off, there is room for stress to escape. Moreover, the sheet 5 or 6, with its corners cut off, develops curl only to a far smaller degree. As a result, no wavelike bends develop in the sheets 5 to 7.

Figure 6:
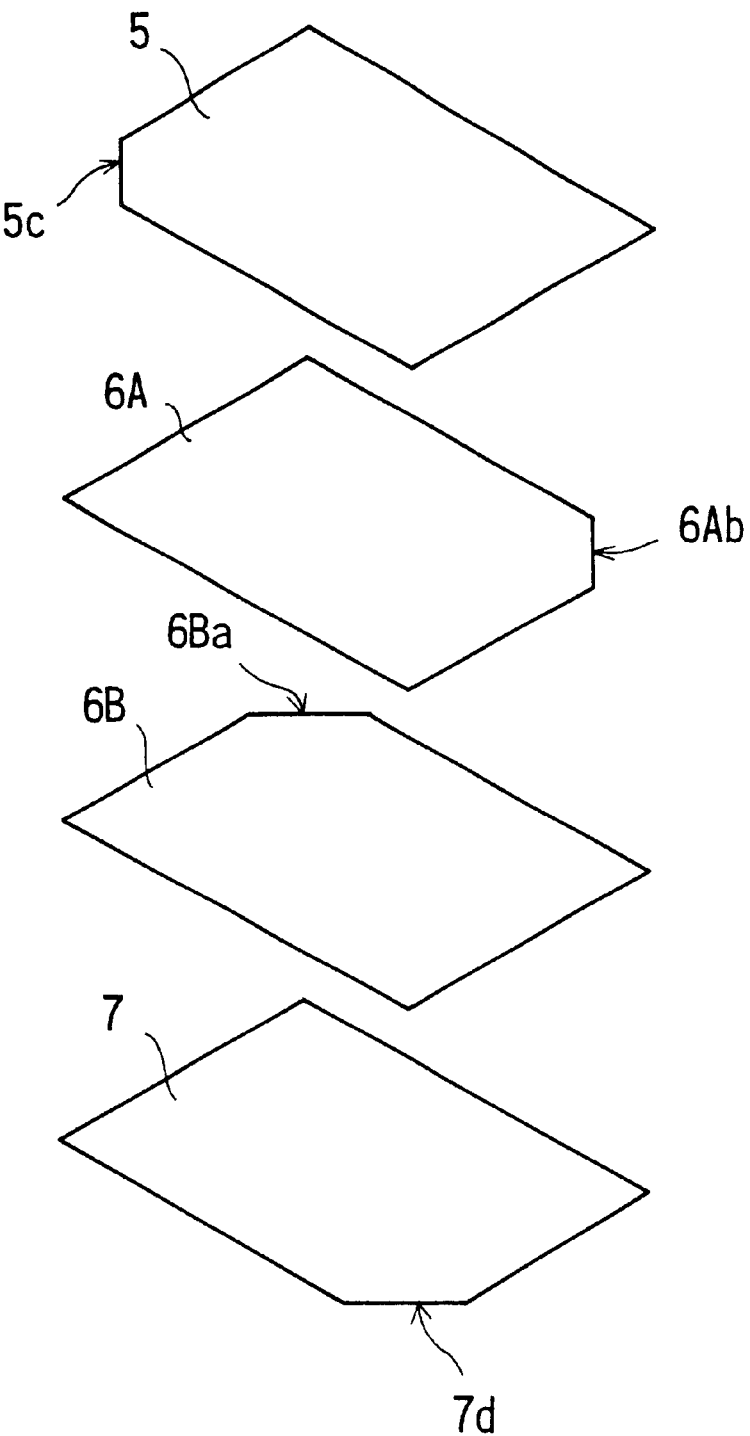
FIG. 6 is a perspective view of the sheet employed in the illumination device of a third embodiment of the invention.

Next, a third embodiment of the invention will be described. FIG. 6 is a perspective view of the sheets 5 to 7 employed in the illumination device of the third embodiment. In this embodiment, when a plurality of sheets are used, different sheets have cuts formed in different corners.

Specifically, in this embodiment, between the frame and the reflecting plate, four sheets, consisting of a diffusive sheet 5, two lens sheets (condensing sheets) 6A and 6B, and a diffusive sheet 7, are placed to permit the liquid crystal display panel to be illuminated uniformly all over its surface. The diffusive sheet 5 has a cut formed in the corner 5c thereof that corresponds to the corner 7c (see FIG. 2). The lens sheet 6A has a cut formed in the corner 6Ab thereof that corresponds to the corner 7b. The lens sheet 6B has a cut formed in the corner 6Ba thereof that corresponds to the corner 7a. The diffusive sheet 7 has a cut formed in the corner 7d thereof.

In this structure, just as in the first embodiment, the clearance C is 0 to 0.1 mm except where a corner is cut off and 0.2 to 0.25 mm where a corner is cut off. Thus, where the sheet 5, 6, or 7 is cut off, the clearance C makes up a larger proportion, namely two fifths or more, of the length L (0.5 mm) of the sheet placement space as measured in the direction of the thickness of the sheets 5 to 7.

By cutting off corners of the plurality of sheets 5 to 7 in this way, an extra margin is produced in the direction of the thickness of the sheets 5 to 7 in the space between the frame 4 and the reflecting plate 10 where there has conventionally been only a scant margin in that direction. Thus, even if thermal expansion/contraction produces a force that tends to curl the sheets 5 to 7, there is room for stress to escape. Moreover, the sheets 5 to 7, with corners thereof cut off, develop curl only to a far smaller degree. As a result, no wavelike bends develop in the sheets 5 to 7.

Figure 7A:
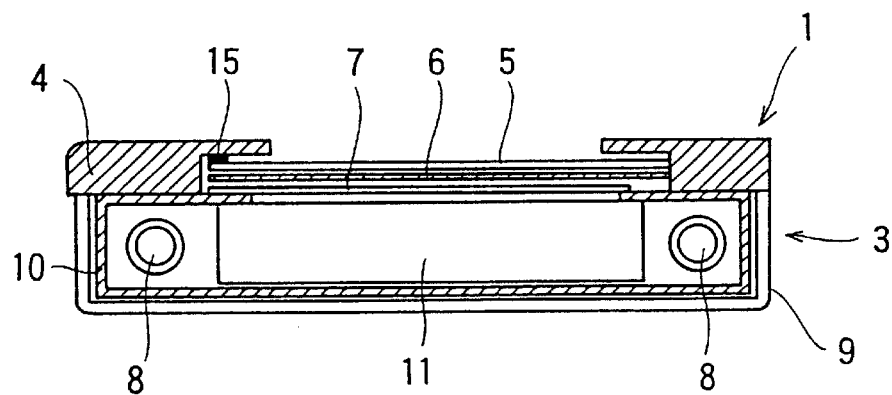
FIG. 7A is a longitudinal sectional view of the illumination device of a fourth embodiment of the invention.
Figure 7B:
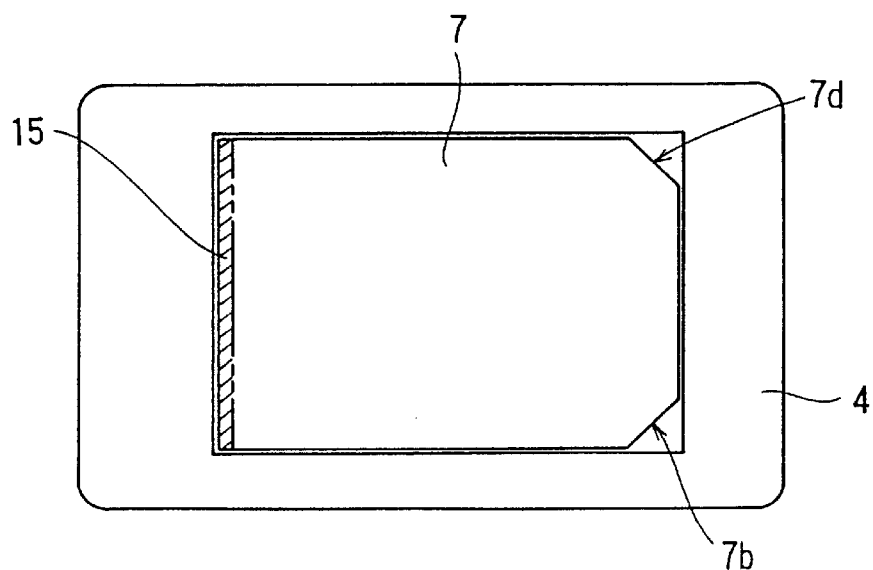
FIG. 7B is a plane sectional view of the illumination device of the fourth embodiment.

Next, a fourth embodiment of the invention will be described. FIG. 7A is a longitudinal sectional view of the illumination device of the fourth embodiment, and FIG. 7B is a plane sectional view of the illumination device of the fourth embodiment In this embodiment, of the sheets 5 to 7 sandwiched between the frame 4 and the reflecting plate 10, the diffusive sheet 5 placed closest to the liquid crystal display panel is, through a bonding portion 15 along one side of the diffusive sheet 5, bonded and thereby fixed to the inner surface of the frame 4. This prevents vibration or the like from causing the sheets 5 to 7 to rub against each other and produce powder. In addition, the diffusive sheet 7 placed farthest from the liquid crystal display panel has cuts formed in two corners 7b and 7d at both ends of the side thereof opposite to the bonding portion 15. Although the diffusive sheet 7 has cuts formed therein in this embodiment, cuts may be formed instead in the corresponding corners of another sheet.

In this structure, just as in the first embodiment, the clearance C is 0 to 0.1 mm except where a corner is cut off and 0.2 to 0.25 mm where a corner is cut off. Thus, where the sheet 5, 6, or 7 is cut off, the clearance C makes up a larger proportion, namely two fifths or more, of the length L (0.5 mm) of the sheet placement space as measured in the direction of the thickness of the sheets 5 to 7.

By cutting off corners of the sheet 5, 6, or 7 in this way, an extra margin is produced in the direction of the thickness of the sheets 5 to 7 in the space between the frame 4 and the reflecting plate 10 where there has conventionally been only a scant margin in that direction. Thus, even if thermal expansion/contraction produces a force that tends to curl the sheets 5 to 7, there is room for stress to escape. Moreover, the sheets, with corners thereof cut off, develop curl only to a far smaller degree. As a result, no wavelike bends develop in the portion of the sheets 5 to 7 opposite to their portion at which they are fixed.

Figure 8A:
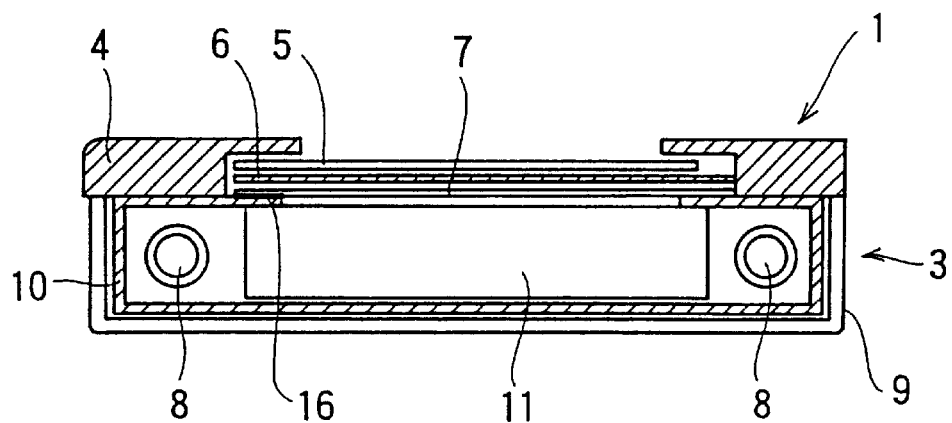
FIG. 8A is a longitudinal sectional view of a modified example of the fourth embodiment.
Figure 8B:
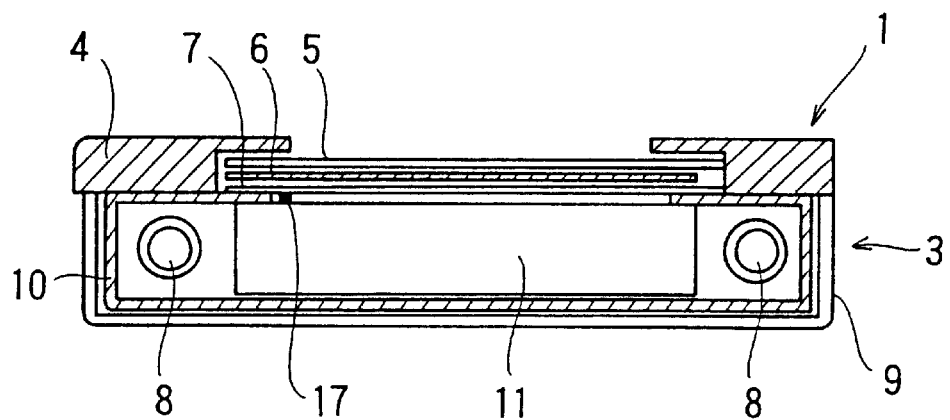
FIG. 8B is a longitudinal sectional view of a modified example of the fourth embodiment.

FIGS. 8A and 8B show modified examples of this embodiment. Specifically, in the example shown in FIG. 8A, the diffusive sheet 7 placed farthest from the liquid crystal display panel is, through a bonding portion 16 along one side of the diffusive sheet 7, bonded and thereby fixed to the outer surface of the reflecting plate 10. In addition, the diffusive sheet 5 placed closest to the liquid crystal display panel has cuts formed in two corners at both ends of the side thereof opposite to the bonding portion 16, like the corners 7b and 7d shown in FIGS. 7A and 7B. Cuts may be formed instead in the corresponding corners of a sheet other than the diffusive sheet 7.

In the example shown in FIG. 8B, the diffusive sheet 7 is, through a bonding portion 17 along one side thereof, bonded and thereby fixed to the outer surface of the light guide plate 11. In addition, the condensing sheet 6 has cuts formed in two corners at both ends of a side thereof opposite to the bonding portion 17, like the corners 7b and 7d shown in FIGS. 7A and 7B. Cuts may be formed instead in the corresponding corners of a sheet other than the condensing sheet 6. Bonding and fixing the sheet 7 to the reflecting plate 10 or to the light guide plate 11 as in these examples provides the same advantages as the structure shown in FIGS. 7A and 7B.

Figure 9A:
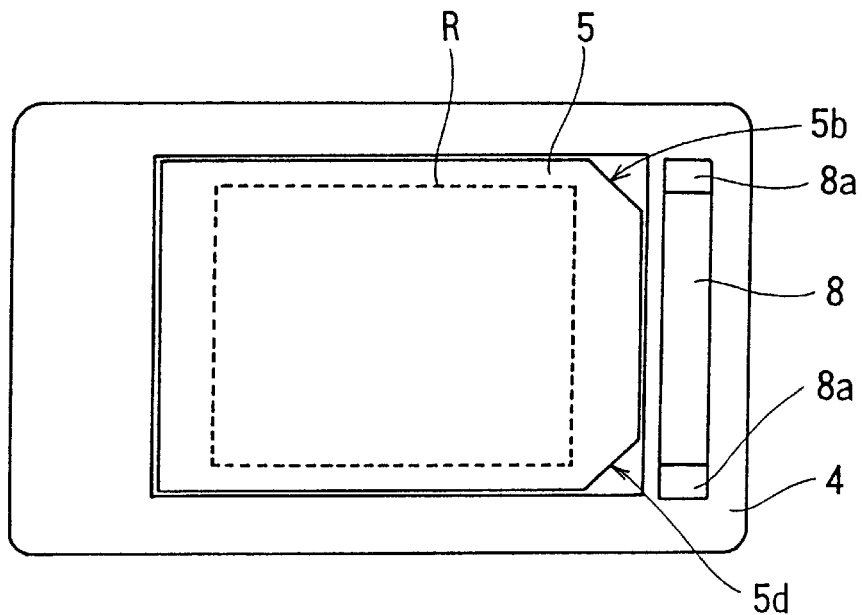
FIG. 9A is a plane sectional view of the illumination device of a fifth embodiment of the invention.
Figure 9B:
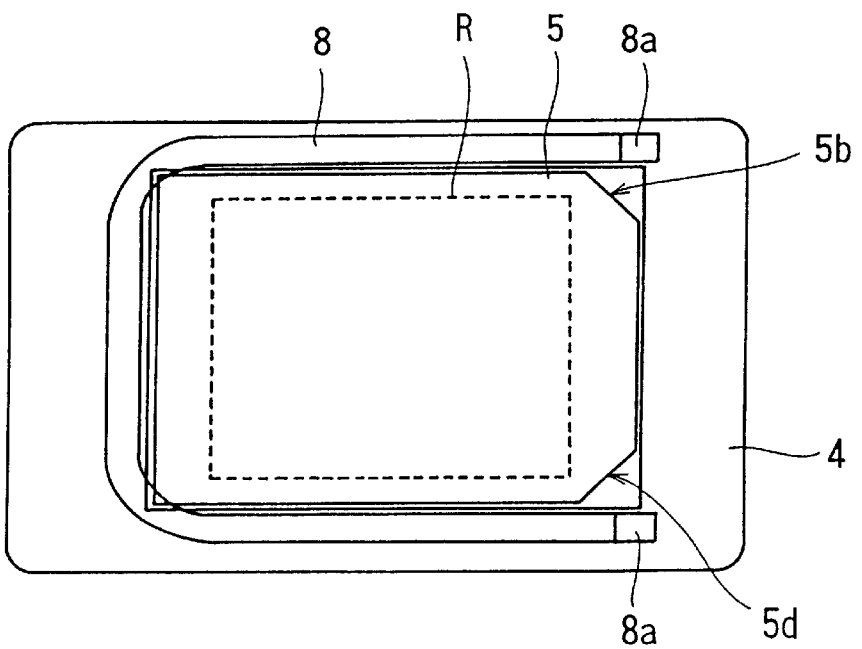
FIG. 9B is a plane sectional view of the illumination device of the fifth embodiment

Next, a fifth embodiment of the invention will be described. FIGS. 9A and 9B are plane sectional views of the illumination devices of the fifth embodiment.

As shown in FIG. 9A, when the light source 8 is in the shape of a straight tube, it has electrode portions 8a at both ends. The electrode portions 8a become hotter than the remaining portion, and therefore the portions of the sheet close to the electrode portions 8a are liable to develop curl and thus bends. This is true also in a case as shown in FIG. 9B where the light source 8 is in the shape of a U-shaped tube.

In this embodiment, the diffusive sheet 5 has cuts formed in two corners 5b and 5d thereof close to the electrode portions 8a of the light source 8. In the figure, the broken lines marked R represent the display area of the liquid crystal display. Cuts may be formed instead in the corresponding corners of another sheet. The structure of this embodiment can be applied also to the structures of the first to fourth embodiments described previously.

In this structure, just as in the first embodiment, the clearance C is 0 to 0.1 mm except where a corner is cut off and 0.2 to 0.25 mm where a corner is cut off. Thus, where the sheet 5, 6, or 7 is cut off, the clearance C makes up a larger proportion, namely two fifths or more, of the length L (0.5 mm) of the sheet placement space as measured in the direction of the thickness of the sheets 5 to 7.

By cutting off corners of the sheet 5, 6, or 7 in this way, an extra margin is produced in the direction of the thickness of the sheets 5 to 7 in the space between the frame 4 and the reflecting plate 10 where there has conventionally been only a scant margin in that direction. Thus, even if thermal expansion/contraction produces a force that tends to curl the sheets 5 to 7, there is room for stress to escape. Moreover, the sheets, with corners thereof cut off, develop curl only to a far smaller degree. As a result, no wavelike bends develop in the sheets 5 to 7. In particular, in this embodiment, cuts are formed close to the electrode portions 8a, which tend to become hotter, which makes secure prevention of bends in the sheets 5 to 7 possible.

Figure 10:
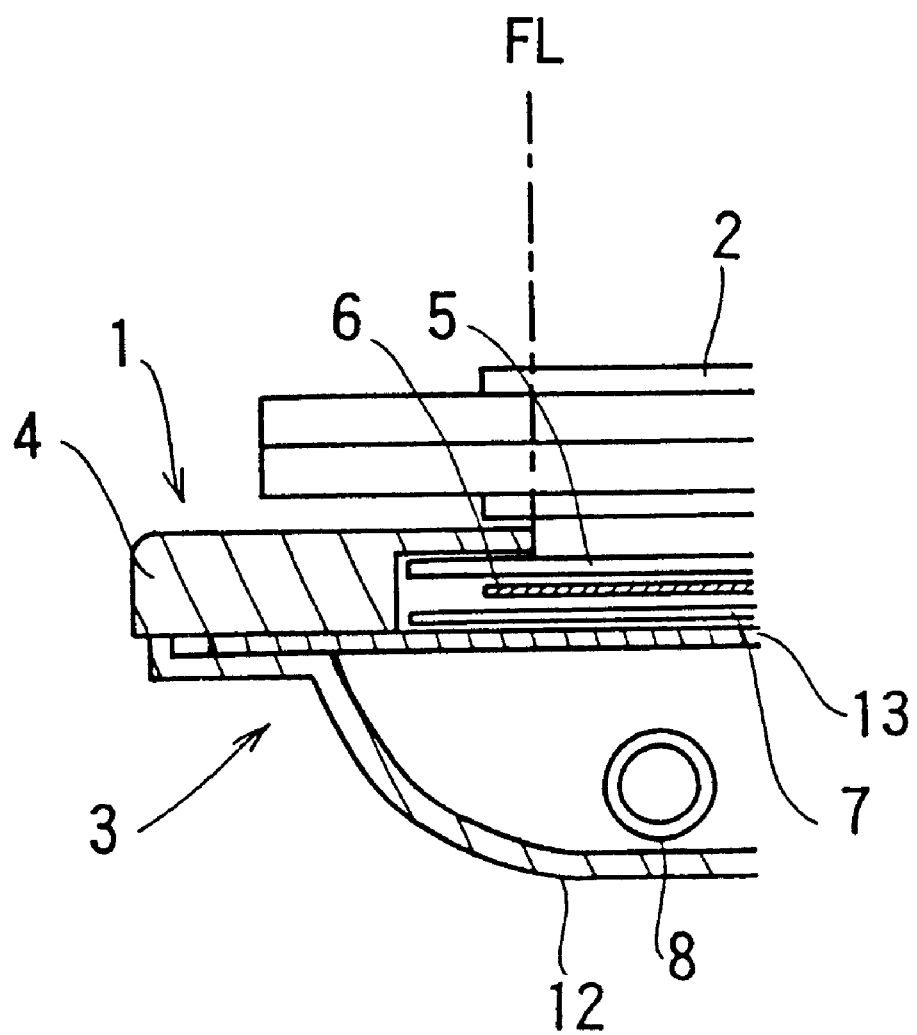
FIG. 10 is a longitudinal sectional view of an example in which the structure of the second embodiment is applied to an illumination device of a type that is lit from beneath.
Figure 12:
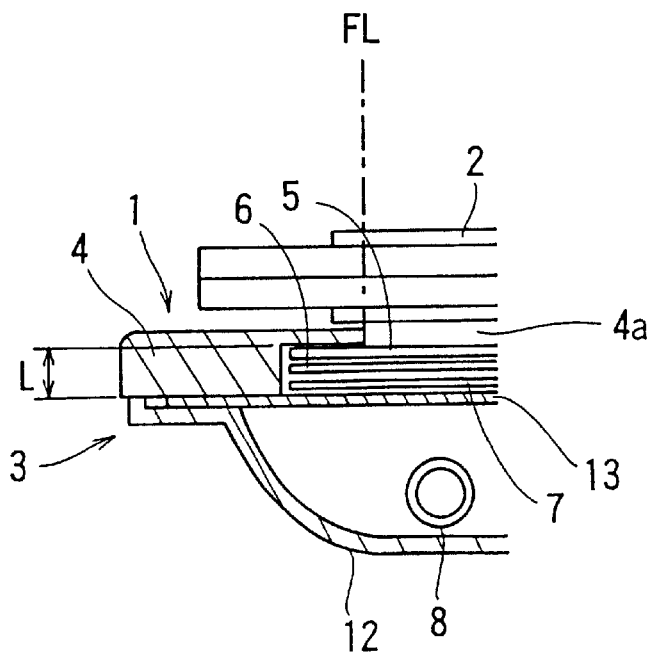
FIG. 12 is a longitudinal sectional view showing the structure of a liquid crystal display provided with a conventional direct backlight.
Figure 13:
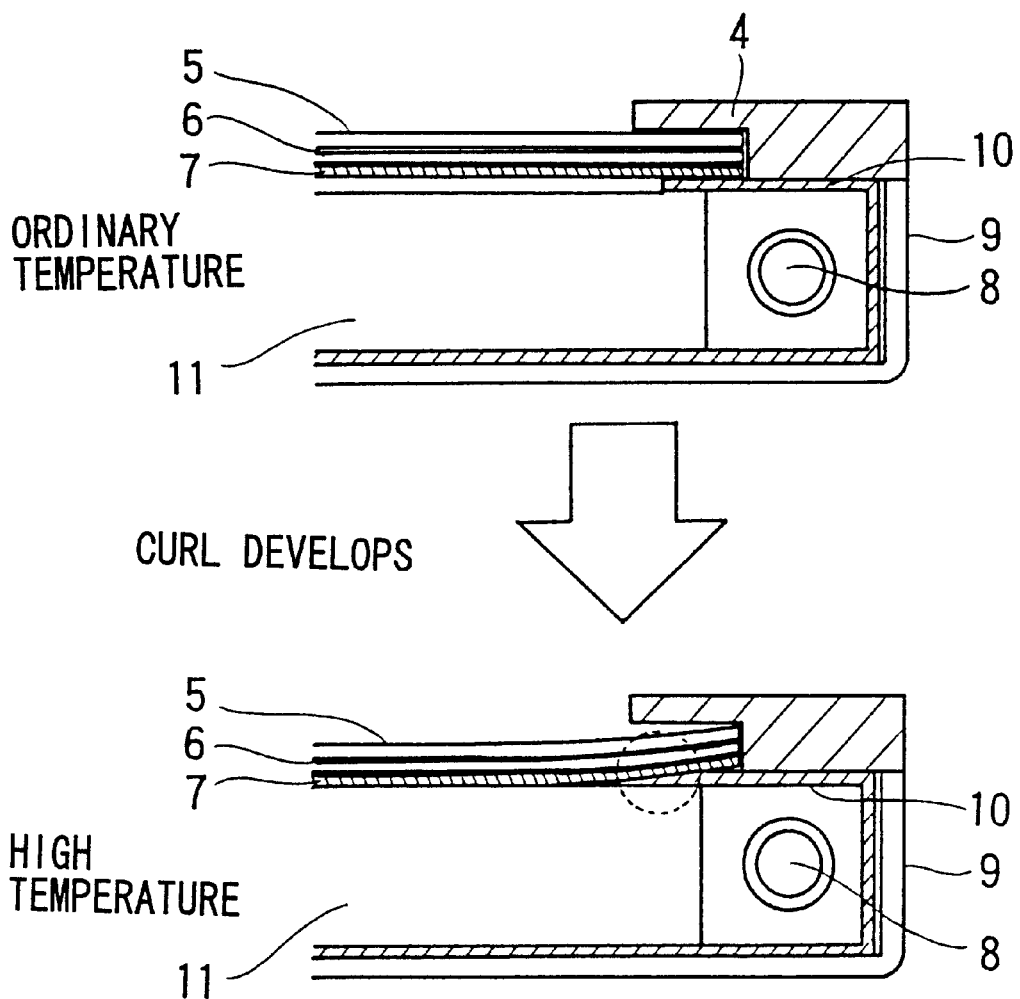
FIG. 13 is a longitudinal sectional view showing how bends develop with a variation in temperature in a conventional illumination device.
Figure 14:
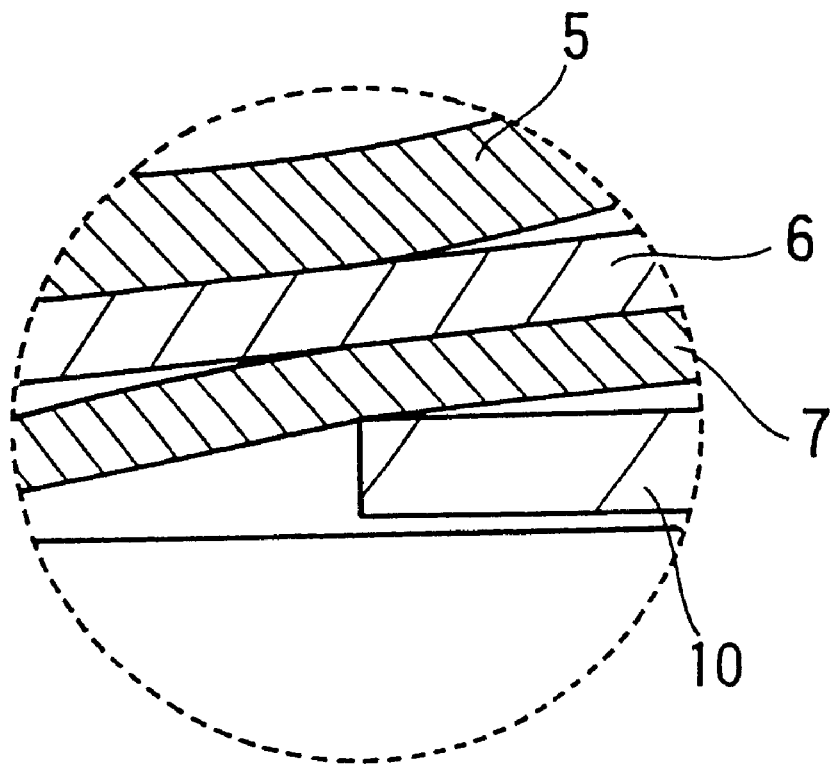
FIG. 14 is an enlarged view of a portion of FIG. 13.
Figure 15:
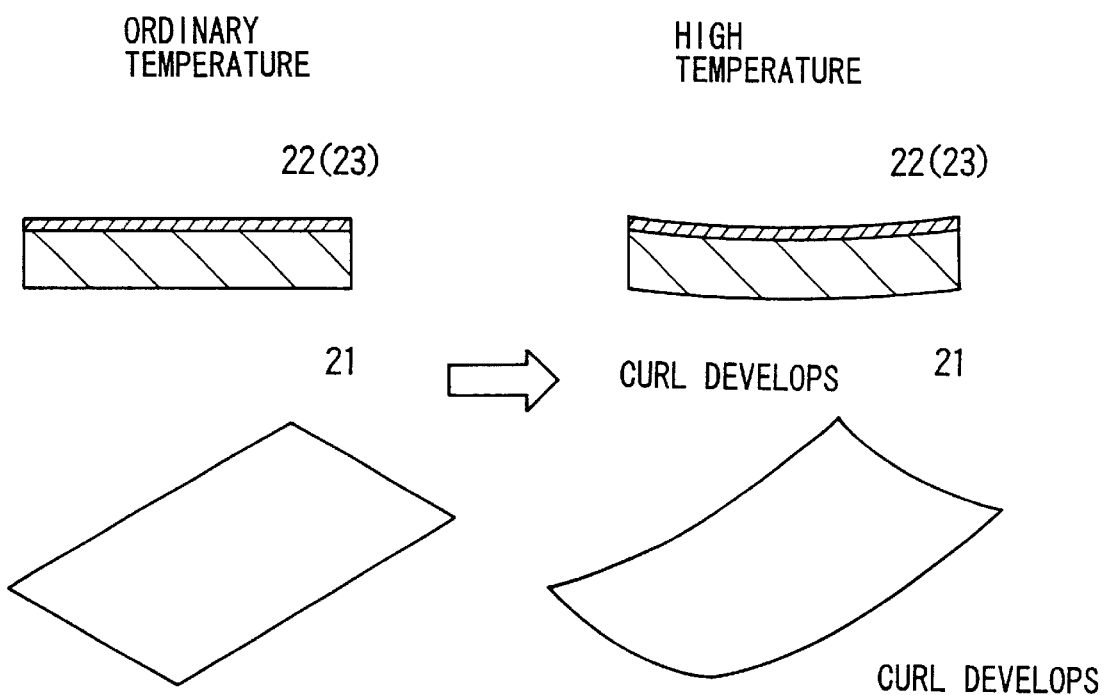
FIG. 15 is a diagram showing a state of an optical or shielding sheet in which curl has developed with a variation in temperature.
Figure 16:
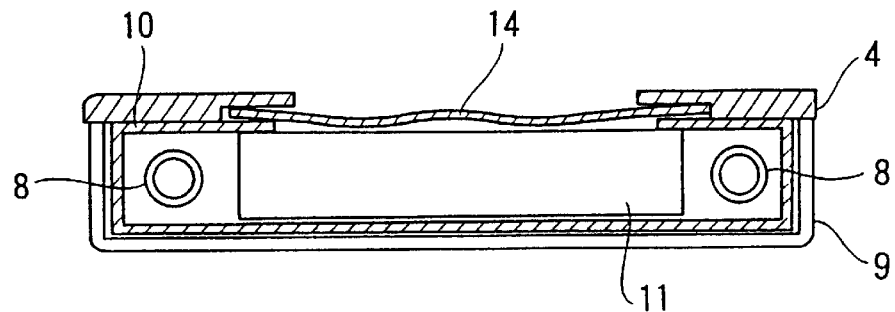
FIG. 16 is a longitudinal sectional view showing a state of a sheet in which bends have developed with a variation in temperature in a conventional illumination device.
Figure 17A:
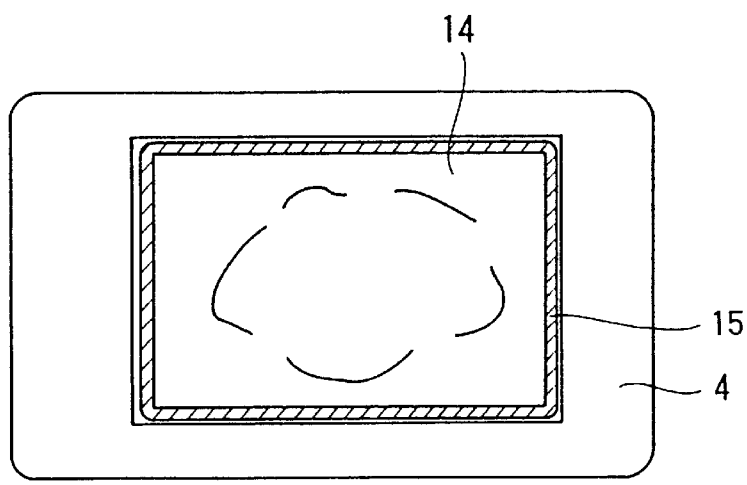
FIG. 17A is a plane sectional view showing a state of a sheet in which bends have developed with a variation in temperature in a conventional illumination device, when the sheet is fixed to the frame by being bonded to the frame along all four sides of the sheet.
Figure 17B:
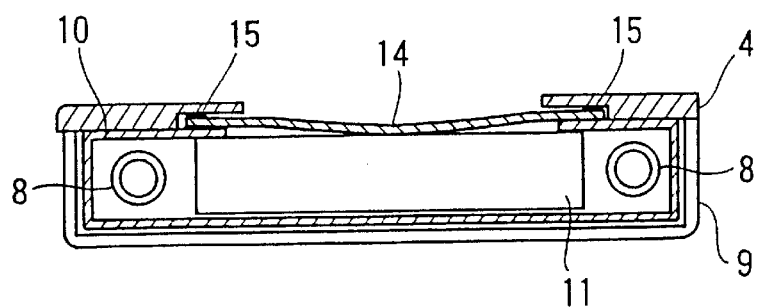
FIG. 17B is a longitudinal sectional view showing a state of a sheet in which bends have developed with a variation in temperature in a conventional illumination device, when the sheet is fixed to the frame by being bonded to the frame along all four sides of the sheet.
Figure 18A:
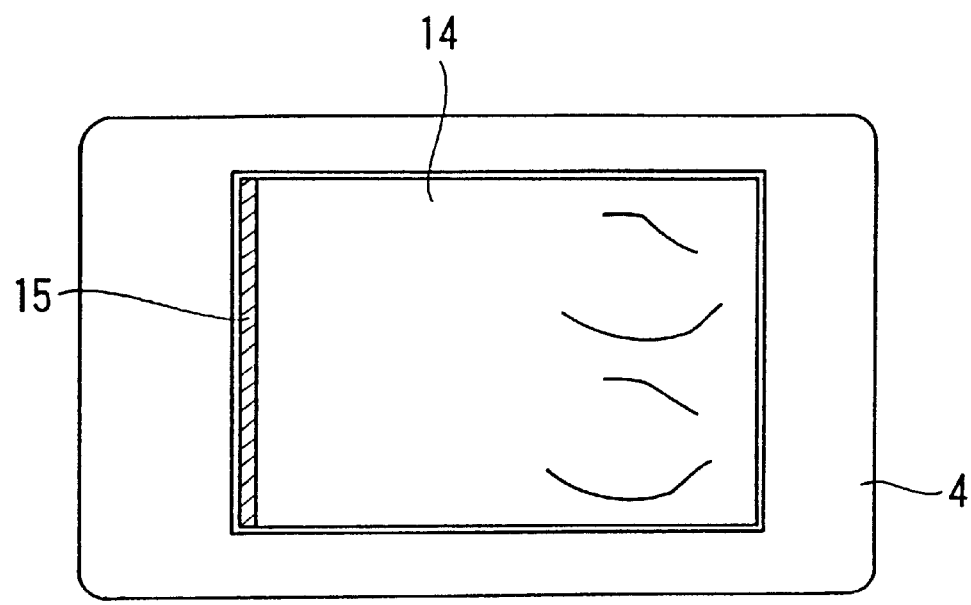
FIG. 18A is a plane sectional view showing a state of a sheet in which bends have developed with a variation in temperature in a conventional illumination device, when the sheet is fixed to the frame by being bonded to the frame along only one side of the sheet.
Figure 18B:
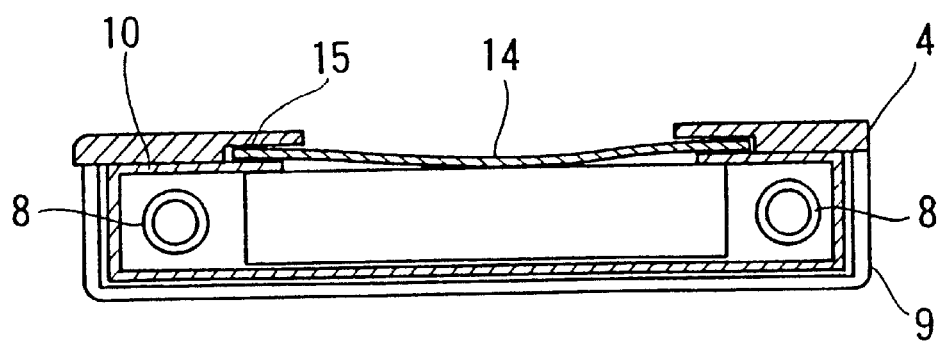
FIG. 18B is a longitudinal sectional view showing a state of a sheet in which bends have developed with a variation in temperature in a conventional illumination device, when the sheet is fixed to the frame by being bonded to the frame along only one side of the sheet.

The embodiments 1 to 5 described above deal with cases where the present invention is applied to an illumination device of an edge-light type as shown in FIG. 11. However, the present invention may be applied to an illumination device of any other type, such as a direct backlight as shown in FIG. 12. FIG. 10 shows a case where the structure of the second embodiment described above is applied to an illumination device of a type that is lit from beneath, wherein the condensing sheet 6 has its corners cut off.

The embodiments 1 to 5 described above deal with cases where a tubular light source such as a fluorescent lamp is used as the light source. However, the present invention may be applied to any other arrangement, such as one in which a point light source such as an LED lamp or a plurality of such point light sources are used. When a plurality of light sources are used, those light sources are arranged so as to form a line or a plane.

The embodiments 1 to 5 described above deal with cases where rectangular sheets are used and some of their corners are cut off. However, the present invention may be applied to any other arrangement, such as one in which sheets shaped otherwise than like a rectangular are used. In that case, cuts are formed in end portions of the sheets as viewed in the direction in which thermal expansion/contraction causes relatively large variation in dimension. For example, sheets in the shape of an ellipse or in the shape of a polygon other than a rectangle may be used, in which case end portions of the sheets are cut off as viewed, in the case of elliptic sheets, in the direction of its major-axis diameter and, in the case of polygonal sheets, in the direction of its diagonals.

The embodiments 1 to 5 described above deal with cases where comparatively thin sheets are used. However, the present invention may be applied to any other arrangement, such as one in which considerably thick sheets are used. In that case, cuts need not be formed so as to penetrate a sheet in the direction of its thickness, but may be formed so as not to penetrate it, i.e. simply as a recess.

The embodiments 1 to 5 described above deal with cases where an illumination device embodying the invention is used as an illumination device for a liquid crystal display. However, the present invention may be applied to any other arrangement, such as one in which an illumination device embodying the invention is used as an illumination device for a display device of any other type, such as an electrochromic display device, or as an illumination device for inspection equipment for inspecting such display devices, optical sheets as used therein, or the like.

What is claimed is:

1. A diffuser sheet in combination with an illumination device, the diffuser sheet having four major elongated edges which define the major sides of the sheet, the combination comprising:

the diffuser sheet being provided inside the illumination device and fitted to a main body of the illumination device by being sandwiched, at least at a portion of the sheet and in a direction of thickness of the sheet, between the main body and a frame fitted to the main body, the diffuser sheet being located at an elevation different than an elevation(s) of a light source and a light guide into which the light source directs light so that the diffuser sheet receives light from the light guide and is at least partially located between the light guide and a device to be illuminated, the diffuser sheet being located closer to the device to be illuminated than the light source and light guide;

wherein the sheet has a cut formed at least in a corner thereof within a region sandwiched in a direction of thickness of the sheet between the main body and the frame so that the cut does not extend beyond a frame opening line (FL) defined by a rim of an opening in said frame, wherein said cut is provided in order to prevent or reduce bending of the sheet upon change in temperature;

wherein a point of intersection is defined by an intersection of: (a) a first line along a first major elongated edge of the sheet adjacent said corner, and (b) a second line along a second major elongated edge of the sheet adjacent the corner; wherein said point of intersection is not embedded within said main body and is not embedded within said frame so that the sheet and illumination device are sized so that the sheet would fit in the illumination device regardless of whether or not the cut was provided therein.

2. An illumination device, comprising:

a main body of the illumination device;

a frame fitted to the main body;

a light source that directs light into a light guide that is located adjacent the light source;

at least one sheet located at least partially within the main body, the sheet being located between the light guide and a device to be illuminated so that the sheet or sheets is/are at an elevation different than the light source and the light guide, the sheet having four major elongated edges which define the major sides of the sheet;

wherein at least one cut is formed in the sheet within a region sandwiched in a direction of thickness of the sheet between the main body and the frame in order to prevent or reduce bending of the sheet upon change in temperature, and wherein a point of intersection is defined by an intersection of: (a) a first line along a first major elongated edge of the sheet adjacent said corner, and (b) a second line along a second major elongated edge of the sheet adjacent the corner; wherein said point of intersection is not embedded within any structural portion of the illumination device so that the sheet would fit in the illumination device regardless of whether or not the cut was provided therein.

3. An illumination device as claimed in claim 2, wherein the sheet that has a cut comprises one of an optical diffuser and an optical condenser, and wherein the sheet has a first portion fixed to the frame or to the main body.

4. An illumination device as claimed in claim 2, wherein the at least one sheet comprises said one sheet and another sheet, and said one sheet has a first portion fixed to the frame or to the main body, and the another sheet has a cut in a portion not facing the first portion of said one sheet.

5. An illumination device as claimed in claim 2, wherein the cut is formed near an electrode portion of the light source.

6. An illumination device as claimed in claim 1, wherein the cut is formed in a chamfered shape.

7. An illumination device as claimed in claim 1, wherein the cut is formed in a rounded shape.

8. An illumination device as claimed in claim 1, wherein the cut is formed in a stepped shape.

9. An illumination device as claimed in claim 2, wherein a clearance C, which is given by $C=L-T$, where L represents a length, as measured in the direction of the thickness of the sheet or a plurality of the sheets, of a space between the frame and the main body where the sheet or sheets are sandwiched and T represents the thickness of the sheet or a sum of the thickness of the sheets, is equal to or greater than two fifths of L.

10. A liquid crystal display comprising an illumination device and a liquid crystal display panel illuminated by the illumination device, wherein the illumination device comprises:

a light source;

a light guide for receiving light from the light source; and a frame having an opening defined therein for permitting passage of light from the light source;

at least one optical sheet located at least partially between the light guide and the display panel so that the at least one sheet is at a different elevation than the light source, wherein a cut is formed in a corner of the at least one sheet in such a way that the cut does not overlap with said opening, in order to prevent or reduce bending of the sheet upon change in temperature, and wherein a point of intersection is defined by an intersection of: (a) a first line along a first major elongated edge of the sheet adjacent said corner, and (b) a second line along a second major elongated edge of the sheet adjacent the corner; wherein said point of intersection is not embedded within any structure of said display so that the sheet would fit in the illumination device regardless of whether or not the cut was provided therein.

11. A liquid crystal display as claimed in claim 10, wherein the sheet has a first portion fixed to a frame or to a main body of the illumination device, and a second portion different from the first portion and having the cut.

12. A liquid crystal display as claimed in claim 11, wherein the at least one sheet includes first and second sheets, and the first sheet is the sheet with the cut and has a first portion fixed to the frame or to the main body, and the second sheet has a cut in a portion not facing to the first portion of the first sheet.

13. A liquid crystal display as claimed in claim 10, wherein the cut is formed near an electrode portion of the light source.

14. A liquid crystal display as claimed in claim 10, wherein the cut is formed in a chamfered shape.

15. A liquid crystal display as claimed in claim 10, wherein the cut is formed in a rounded shape.

16. A liquid crystal display as claimed in claim 10, wherein the cut is formed in a stepped shape.

17. A liquid crystal display as claimed in claim 11, wherein a clearance C, which is given by $C=L-T$, where L represents a length, as measured in the direction of the thickness of the sheet or a plurality of the sheets, of a space between the frame and the main body where the sheet or sheets are sandwiched and T represents the thickness of the sheet or a sum of the thickness of the sheets, is equal to or greater than two fifths of L.

18. The liquid crystal display of claim 10, wherein the sheet comprises a diffuser.

19. The liquid crystal display of claim 10, wherein a plurality of corners of the sheet are cut off in order to prevent or reduce bending of the sheet upon exposure to temperature change.

20. The combination of claim 1, wherein the diffuser sheet is located at an elevation above the elevation(s) of the light source and the light guide into which the light source directs light.

21. An illumination device comprising:

at least one diffuser sheet provided inside the illumination device and fitted to a main body of the illumination device, the diffuser sheet being located at an elevation above an elevation of a light source and a light guide into which the light source directs light so that the diffuser sheet receives light from the light guide and is at least partially located between the light guide and a device to be illuminated;

wherein the diffuser sheet has a cut formed in a corner thereof within a region sandwiched in a direction of thickness of the sheet between the main body and a frame fitted to the main body in order to prevent or reduce bending of the diffuser sheet upon change in temperature, and wherein a point of intersection is defined by an intersection of: (a) a first line along a first major elongated edge of the sheet adjacent said corner, and (b) a second line along a second major elongated edge of the sheet adjacent the corner; wherein said point of intersection is not embedded within said main body and is not embedded within said frame fitted to the main body.

* * * * *